US005173016A

United States Patent [19]

Ellison et al.

[11] Patent Number: 5,173,016

[45] Date of Patent: Dec. 22, 1992

[54] APPARATUS AND METHOD FOR FORMING FINGER AND THUMB HOLES IN BOWLING BALLS

[75] Inventors: John D. Ellison, Torrence, Calif.; Ronald F. Hoppe, Tacoma, Wash.

[73] Assignee: Pro Shops Unlimited, Kent, Wash.

[21] Appl. No.: 687,585

[22] Filed: Apr. 17, 1991

[51] Int. Cl.[5] .......................... B23C 3/00; B25B 11/00

[52] U.S. Cl. ...................................... 409/132; 269/21; 408/1 R; 409/225

[58] Field of Search ............... 409/219, 225, 131, 132, 409/163; 279/3; 408/1 R, 241 R, 76; 269/21; 29/560, 26 A

[56] References Cited

U.S. PATENT DOCUMENTS

| | | | |
|---|---|---|---|
| 2,269,946 | 1/1942 | Lange | 144/93 |
| 2,283,469 | 5/1942 | Shepard | 77/63 |
| 2,428,669 | 10/1947 | Hopkins | 77/63 |
| 2,490,120 | 12/1949 | Ellison et al. | 77/63 |
| 2,508,281 | 5/1950 | Miller et al. | 90/58 |
| 2,879,679 | 3/1959 | Neff | 77/63 |
| 2,910,780 | 11/1959 | Neff | 33/174 |
| 2,973,674 | 3/1961 | Hladik | 77/63 |
| 3,085,476 | 4/1963 | Sloan et al. | 90/12 |
| 3,095,767 | 7/1963 | Jesonis | 77/62 |
| 3,110,226 | 11/1963 | Dionne | 90/62 |
| 3,124,018 | 3/1964 | Gough | 77/63 |
| 3,137,074 | 6/1964 | Jesonis | 33/174 |
| 3,143,901 | 8/1964 | Bawtinheimer | 77/32.2 |
| 3,167,326 | 1/1965 | Heessels | 279/3 |
| 3,179,013 | 4/1965 | Goldsmith | 90/20 |
| 3,262,340 | 7/1966 | Sammons et al. | 77/62 |
| 3,271,870 | 9/1966 | Blaker et al. | 33/174 |
| 3,329,043 | 7/1967 | Stanford | 77/31 |
| 3,349,647 | 10/1967 | Stan | 77/5 |
| 3,382,740 | 5/1968 | Lotta | 77/5 |
| 3,415,146 | 12/1968 | Schroeder, Jr. | 77/62 |
| 3,465,619 | 9/1969 | Blaker et al. | 77/5 |
| 3,521,506 | 7/1970 | DiNardo | 77/5 |
| 3,689,165 | 9/1972 | Small | 408/3 |
| 3,714,703 | 2/1973 | Maples | 29/560 |
| 3,805,394 | 4/1974 | Marberg | 33/174 |
| 3,843,276 | 10/1974 | Williams | 408/236 |
| 4,534,093 | 8/1985 | Jahnke et al. | 29/26 A |
| 4,561,642 | 12/1985 | Parque | 269/21 |
| 4,684,113 | 8/1987 | Douglas et al. | 269/21 |
| 4,815,903 | 3/1989 | Skidmore, Sr. | 409/131 |

*Primary Examiner*—William Briggs
*Attorney, Agent, or Firm*—Delbert J. Barnard

[57] ABSTRACT

A vacuum dish (10) is rigidly bolted (60) to the support table (12) of a milling machine (14). A bowling ball (74) is set down onto the upwardly directed hard rim (72) of the vacuum dish (10). An elastomeric seal (86) is moved upwardly along the sidewall (66) of the vacuum dish (10), onto an upwardly converging conical surface (70) which borders the rim (72). This puts the elastomeric seal (86) into contact with both the conical surface (70) and an adjacent surface portion of the bowling ball (74). Precision lead screw mechanisms (42, 48, 44, 50) are operated to shift the support table (12) and the vacuum dish supported bowling ball (74) along X and Y axes, to position the bowling ball (74) relative to the vertical axis (Z) of a hole boring bit (30). The hole boring (30) is both rotated and moved vertically downwardly to form a finger or thumb hole in the bowling ball (74). Multiple passes of the hole boring bit (30) may be made into the bowling ball (74), with the bowling ball (74) being adjusted sideways in position a small amount between each pass, to give the hole an oblong cross section.

14 Claims, 3 Drawing Sheets

APPARATUS AND METHOD FOR FORMING FINGER AND THUMB HOLES IN BOWLING BALLS

TECHNICAL FIELD

This invention relates to the formation of finger and thumb holes in bowling balls. More particularly, it relates to both apparatus and method aspects of forming finger and thumb holes in bowling balls by the use of a vertical axis milling machine.

BACKGROUND OF THE INFORMATION

It is known to use a conventional drill press to drill finger and thumb holes in bowling balls. A problem with a drill press is that the drill bit spindle is incapable of holding the drill bit in a true position on a drill line. Also, it is necessary to provide the drill press with a specially constructed support for both holding the bowling ball and moving it in position relative to the drill line. By way of example, U.S. Pat. No. 2,973,674, granted Mar. 7, 1961, to Joseph A. Hladik, discloses a ball holding and positioning fixture which includes three snubbers atop three standards, adapted for clamping a bowling ball between them. The snubbers are constructed from a resilient material and thus will permit some movement of the bowling ball. Also, there is some give in the clamp screw which moves one of the snubbers relative to the other two snubbers.

A principal object of the present invention is to form the finger and thumb openings by use of a standard vertical axis milling machine. A milling machine possesses a spindle constructed to hold the milling bit of the hole boring bit type true on a vertical drill line. A milling machine also includes a built in mechanism for positioning the support table in any horizontal position relative to the milling bit axis. A further object of the invention is to provide a vacuum holder for the bowling ball which is constructed to hold the bowling ball in an unyielding position on the support table.

The aforementioned U.S. Pat. No. 2,973,674, and the following additional U.S. patents, should be considered for the purpose of putting the present invention into proper perspective relative to the prior art: U.S. Pat. No. 2,269,946, granted Jan. 13, 1942, to Joseph A. Lange; U.S. Pat. No. 2,283,469, granted May 19, 1942, to Henry B. Shepard; U.S. Pat. No. 2,428,669, granted Oct. 7, 1947, to Henry Hopkins; U.S. Pat. No. 2,490,120, granted Dec. 6, 1949, to Clifford L. Ellison and Louis Pospischek; U.S. Pat. No. 2,879,679, granted Mar. 31, 1959, to Wilber L. Neff; U.S. Pat. No. 3,095,767, granted Jul. 2, 1963, to Alexander Jesonis; U.S. Pat. No. 3,143,901, granted Aug. 11, 1964, to Charles E. Bawtinheimer; U.S. Pat. No. 3,179,013, granted Apr. 20, 1965, to Bernard Goldsmith; U.S. Pat. No. 3,262,340, granted Jul. 26, 1966, to Martin V. Sammons, Robert D. Baker and John F. Nixon; U.S. Pat. No. 3,329,043, granted Jul. 4, 1967, to Robert M. Stanford; U.S. Pat. No. 3,349,647, granted Oct. 31, 1967, to Louis J. Stan; U.S. Pat. No. 3,382,740, granted May 14, 1968, to Russell P. Lotta; U.S. Pat. No. 3,415,146, granted Dec. 10, 1968, to Kenneth K. Schroeder, Jr.; U.S. Pat. No. 3,465,619, granted Sep. 9, 1969, to David P. Blaker and Kenneth J. Conrad; U.S. Pat. No. 3,521,506, granted Jul. 21, 1970, to Frank Di Nardo; U.S. Pat. No. 3,714,703, granted Feb. 6, 1973, to Travis N. Maples; U.S. Pat. No. 3,689,165, granted Sep. 5, 1972, to Edward E. Small; and U.S. Pat. No. 3,843,276, granted Oct. 22, 1974, to Michael Williams.

A cursory examination of these patents will show that the ball holding fixtures disclosed by the patents are complicated and because of the complexity are slow to use. Also, they include mechanical clamp members which are to some extent yieldable. U.S. Pat. No. 3,714,703 discloses a type of vacuum holder for holding a bowling ball while drilling finger holes. However, an elastomeric seal ring is provided at the rim of the vacuum holder and the bowling ball is seated on this elastomeric seal ring. Also, the vacuum holder is at the upper end of an elongated rotary shaft which is to some extent yieldable. This arrangement of the seal ring, and the mounting of the vacuum holder for rotation, are both undesirable if the vacuum holder is to be expected to hold the bowling ball rigid while holes are being drilled in the ball. An object of the present invention is to provide a vacuum holder which is constructed and arranged to hold a bowling ball very rigid, permitting both accurate placement and true formation of the finger and thumb holes by use of a milling machine. A further object of the invention is to provide a technique of using a standard vertical axis milling machine and the vacuum holder together for enabling a relatively unskilled operator to quickly, easily and accurately form finger and thumb holes in bowling balls, including oblong holes.

DISCLOSURE OF THE INVENTION

One aspect of the invention is to provide a machine for precision milling and placement of a finger or thumb hole in a bowling ball. Such machine is basically characterized by a rigid frame having upper and lower portions. A spindle and spindle drive are supported by the upper portion of the frame for precision rotation of the spindle about a vertical Z axis. The spindle, spindle drive and upper frame portion support an elongated milling bit of the hole boring bit type for precision rotation and precision downward advancement along the Z axis. The hole boring bit has a cutting tip shaped such that its end and side portions cut when the bit rotates about, and is advanced endwise downwardly along, the Z axis. The lower portion of the frame supports a positioning base which in turn supports a horizontal support table. The positioning base includes a micrometer adjustment means for precision movement of the support table within a horizontal frame, along X and Y axes.

A vacuum dish is rigidly secured to the support table for precision movement along with the table. The vacuum dish includes a rigid cylindrical sidewall which defines an upwardly directed, rigid bowling ball supporting circular rim and a vacuum chamber. A means is provided for establishing a vacuum within the vacuum chamber of sufficient strength to hold the ball in a fixed rigid position on the rigid circular rim of the vacuum dish.

According to another aspect of the invention, an elastomeric seal ring surrounds the circular sidewall and is movable axially upwardly along the sidewall into a position of contact with both the sidewall and a bowling ball sitting on the rim.

In preferred form, the circular sidewall of the vacuum dish includes an upwardly converging conical outer surface that is outwardly adjacent the circular rim. The conical surface facilitates movement of the seal ring into contact with the bowling ball.

In accordance with the method aspect of the invention, a rigid vacuum dish is provided which has a rigid cylindrical sidewall defining a vacuum chamber and including an upwardly directed circular hard rim. The vacuum dish is placed on, and is secured to, a horizontal support table portion of a vertical axis milling machine. The support table is supported for precision adjustment in position within a horizontal plane along X and Y axis, below a spindle which is supported for precision rotation about the vertical axis. A hole boring bit is positioned in the spindle. The hole boring bit includes a cutting tip having end and side portions which cut when the bit is rotated about, and advanced endwise downwardly along, the vertical axis.

According to another aspect of the invention, an elastomeric seal ring is positioned about the cylindrical sidewall of the vacuum dish. After the bowling ball is placed on the circular hard rim, the vacuum seal ring is moved upwardly along the sidewall of the vacuum dish into contact with the bowling ball adjacent the circular hard rim. A bowling ball is placed on the circular hard rim of the vacuum dish. Then, the vacuum chamber is connected with a source of negative pressure sufficient to hold the bowling ball into a fixed position against the circular hard rim. The horizontal support table is adjusted in position to place the tip of the hole boring bit in alignment with the starting point for a finger or thumb hole. The hole boring bit is both rotated and moved downwardly along the vertical axis into contact with the bowling ball, and then into the bowling ball to form a hole of the desired depth. Then, the hole boring bit is withdrawn out from the hole.

According to a further aspect of the invention, after the drill bit has been withdrawn from the hole, the horizontal support table is adjusted in position to move the hole slightly to one side of the drill path of the hole boring bit. The hole boring bit is then again rotated and advanced vertically downwardly into the bowling ball to widen the previously formed hole.

Accordingly, an object of the invention is to form oblong finger and thumb holes in bowling balls, by first drilling a circular hole, and then shaving one side of the hole to change the cross sectional shape of the hole. A hole boring bit is used to both drill the circular hole and to shave the circular hole to form the oblong hole.

Yet another object of the invention is to easily, quickly and accurately form finger and thumb holes in bowling balls by use of a conventional vertical axis milling machine, equipped with a specially constructed vacuum holder which does not include a yieldable portion between the holder and the ball. The specially constructed vacuum holder includes a hard seat and an elastomeric seal ring which seals while allowing the bowling ball to be held in a unyielding position on the seat. This holder enables full utilization of the precision drilling and milling capabilities which distinguish a milling machine from a conventional drill press.

Other objects, advantages and features of the invention will be hereinafter described in connection with, or will be apparent from, the description of the preferred embodiment or best mode, the appended claims and annexed drawings.

BRIEF DESCRIPTION OF THE DRAWINGS

In the drawings, like referenced numerals designate like parts throughout the several views, and.

BEST MODE FOR CARRYING OUT THE INVENTION

Figure 1:
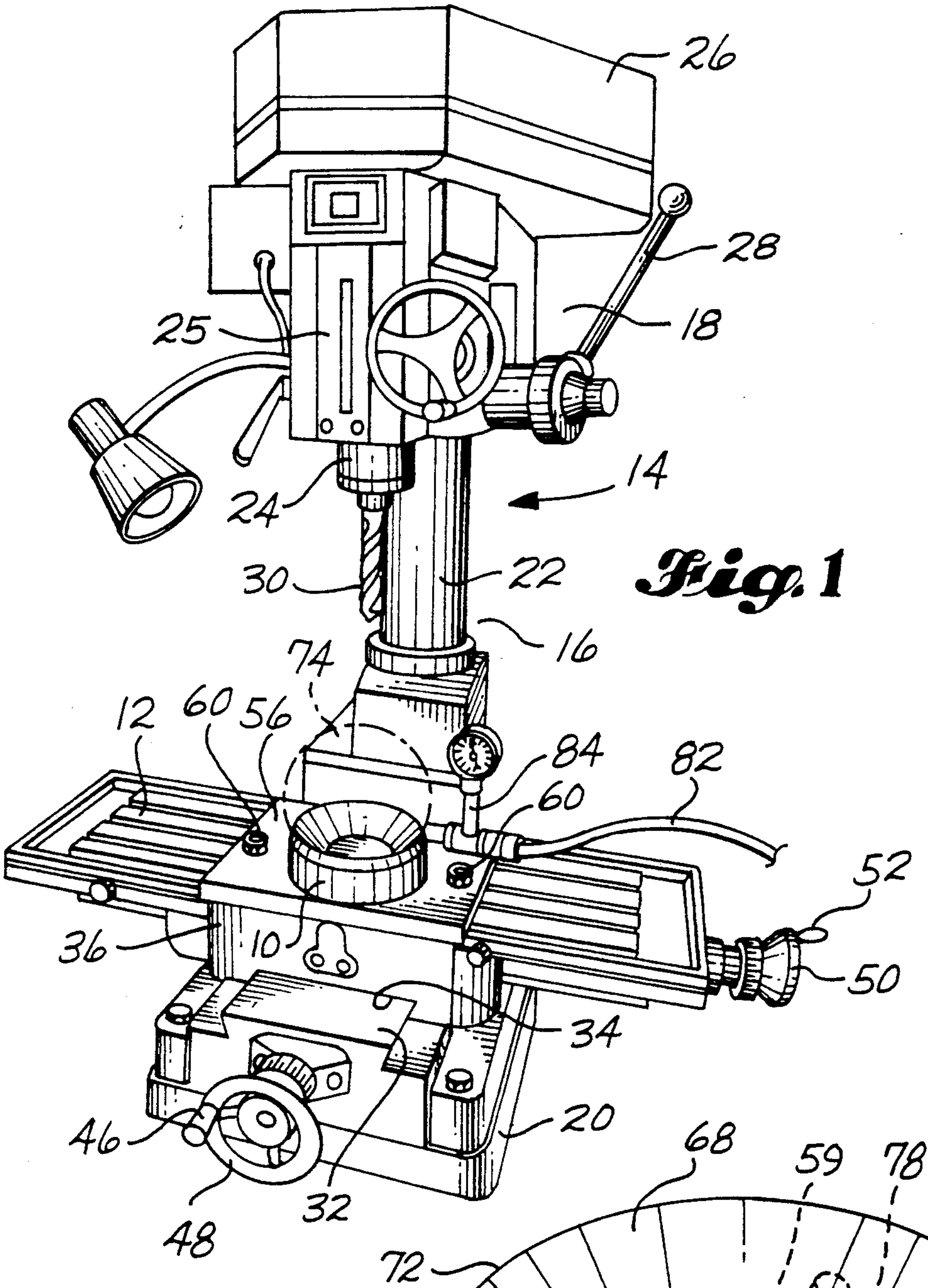
FIG. 1 is a pictorial view looking towards the front and one side of a vertical axis milling machine, showing a vacuum dish of the invention clamped to the milling machine table, and further including a phantom showing of a bowling ball on the vacuum dish.
Figure 2:
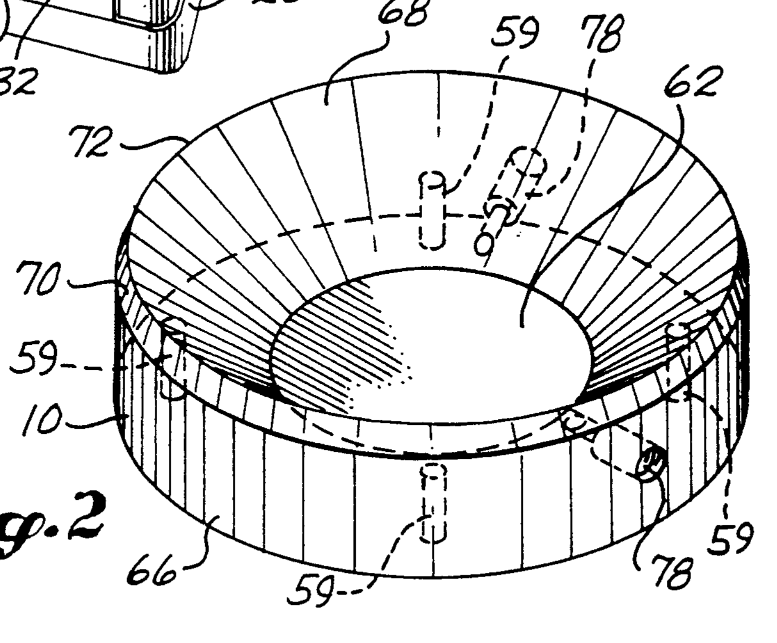
FIG. 2 is a larger scale pictorial view of a vacuum dish, taken from above and showing fastener holes and ports in phantom.

Referring to FIG. 1, a vacuum dish 10 is shown to be secured to the horizontal work support table 12 of a standard vertical axis milling machine 14. By way of typical and therefore nonlimitive example, the illustrated milling machine 14 is a Jet Equipment milling machine, Model No. JMD-18, Stock No. 350018.

As illustrated, a vertical axis milling machine is characterized by a rigid frame 16 having an upper frame portion 18 and a lower frame portion 20 rigidly interconnected by a post or column 22 positioned at the rear of the machine 14. The upper frame portion 18 supports a rotary spindle 24 and a spindle drive (not shown) located within an upper housing 26. A known mechanism for raising and lowering the spindle 22 relative to the support table 12 is incorporated into an upper forward portion 25 of machine 14. This mechanism includes a control handle 28. A pull on the handle 28, by an operator standing in front of the machine 14, causes a vertically downward movement of the spindle 24 and a hole boring bit 30 which is secured to spindle 24. The bit 30 moves downwardly along a vertical axis Z. This axis may also be referred to as the bit axis or the drill axis. The spindle 24 and bit 30 are automatically moved upwardly in response to the operator releasing the pull, allowing handle 28 to swing back towards the rear of the machine 14.

Figure 3:
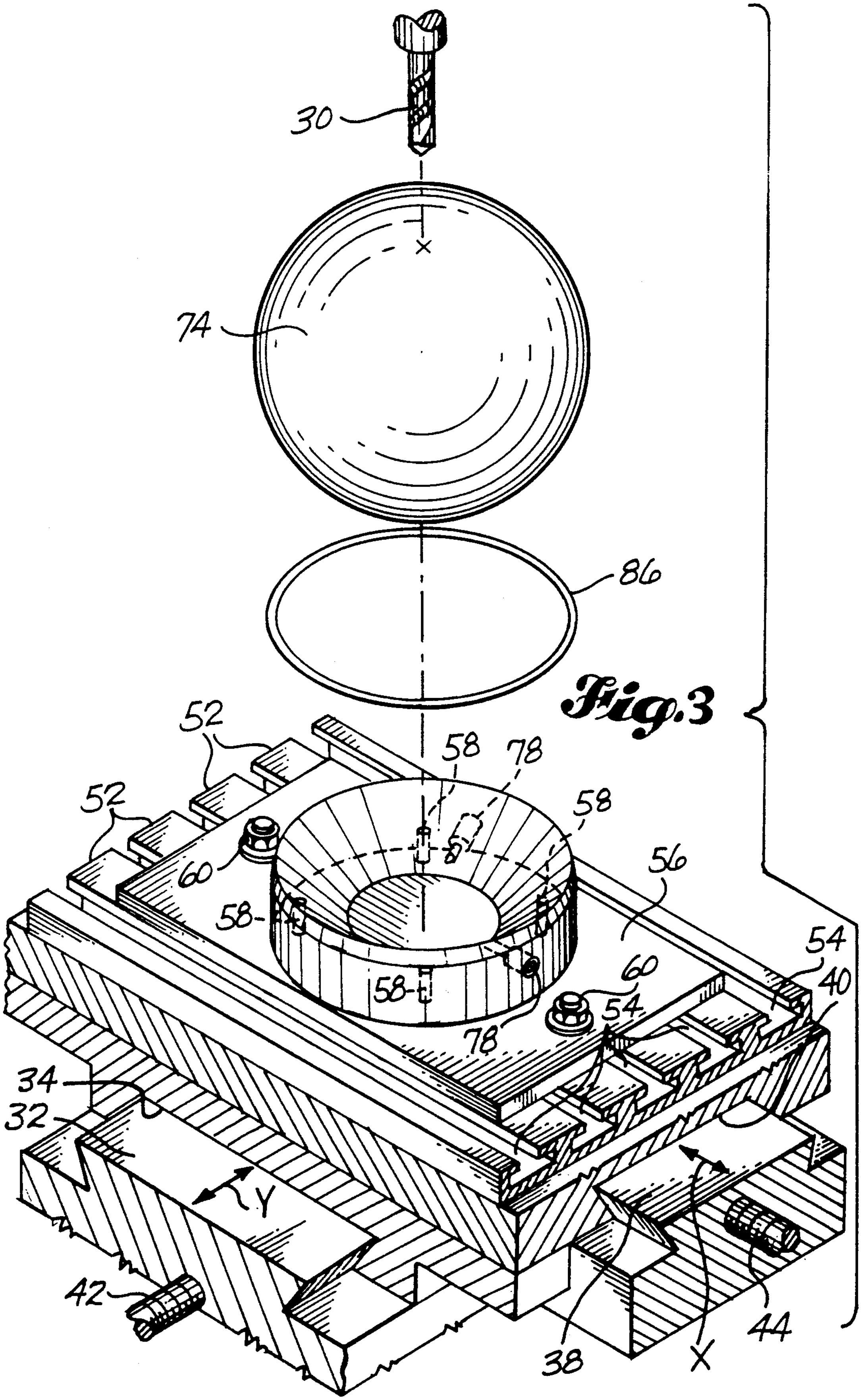
FIG. 3 is a fragmentary pictorial view, showing a bowling ball and an elastomeric seal ring exploded away from the vacuum dish that is secured to the table of the machine, such view including portions of the position adjustment mechanism for the support table.

The lower frame portion 20 of machine 14 includes a positioning base for the support table 12. In the particular machine that is illustrated, this mechanism includes a dovetail guide track 32 which extends front to rear of frame portion 20. Track 32 is received within a complementary dovetail slideway 34 which is formed in the lower portion of a carriage frame 36. As best shown by FIG. 3, carriage frame 36 includes a second dovetail track 38 which extends sideways or laterally of the machine 14. Track 38 is received within a complementary slideway 40 which is carried by a lower portion of the support table 12. In FIG. 3 the dovetail tracks 32, 38, the dovetail slideways 34, 40 and the lead screws 42, 44 are shown rather schematically. These components include bearings, etc. which are not shown because the milling machine is conventional and per se is not a part of the invention.

In a known manner, a lead screw 42 is provided to move carriage 36. The lead screw 42 is rotated in one direction to move carriage 36 towards the rear of the machine 14, and in the opposite direction to move the carriage 36 towards the front of the machine. The operator rotates lead screw 42 by grasping a handle 46 on a control wheel 48 which is connected to the lead screw 42. A similar control wheel 50 is connected to lead screw 44 and it includes a handle 52. When the operator grasps handle 52 and rotates wheel 50 and lead screw 44 in a first direction, the support table 12 is moved sideways in a first direction. A reverse rotation of wheel 50 and lead screw 44 will cause the support table 12 to be moved sideways in the opposite direction. Herein the front to rear movement will sometimes be referred to as movement along a Y axis. The sideways movement will sometimes be referred to as movement along a X axis. Of course, the movement of interest is the movement of the support table 12. As will later be described, in the practice of the invention, the positioning mechanism is operated to move support table 12 within a horizontal plane, so as to position the vacuum holder 10 on table 10, and a bowling ball holder 10, in a desired position relative to the Z axis, i.e. the bit axis.

An important, inherent characteristic of a milling machine, leading to the selection of a milling machine for use in practice of the invention, is the accuracy of adjustment of the support table and the accuracy of the cutting operation performed by the hole boring bit 30. The lead screw adjustments can be made to provide accuracy in the order of about five thousands of an inch. The spindle 24 is capable of holding the hole boring bit 30 true on the Z axis. This is because the spindle of a milling machine has a relatively large diameter and is supported for rotation by a plurality of relatively large bearings. Also, the heavy rigid frame of the machine holds the bearings and spindle against even very small movements off the drill line. The spindle of a conventional drill press will allow the drill bit to deflect sideways and wobble while rotating. The spindle of a milling machine will hold the hole boring bit true on line and not permit it to wobble.

Another desirable characteristic of a milling machine is that the support table 12 is constructed to permit easy attachment of a fixture or a workpiece. Referring to FIG. 3, table 12 comprises elongated support bars 52 separated by inverted T-slots 54. Herein the term T-slot is meant to mean a slot having a wide base or lower portion and a narrower upper portion. The term T-slot is meant to include a dovetail slot.

Figure 4:
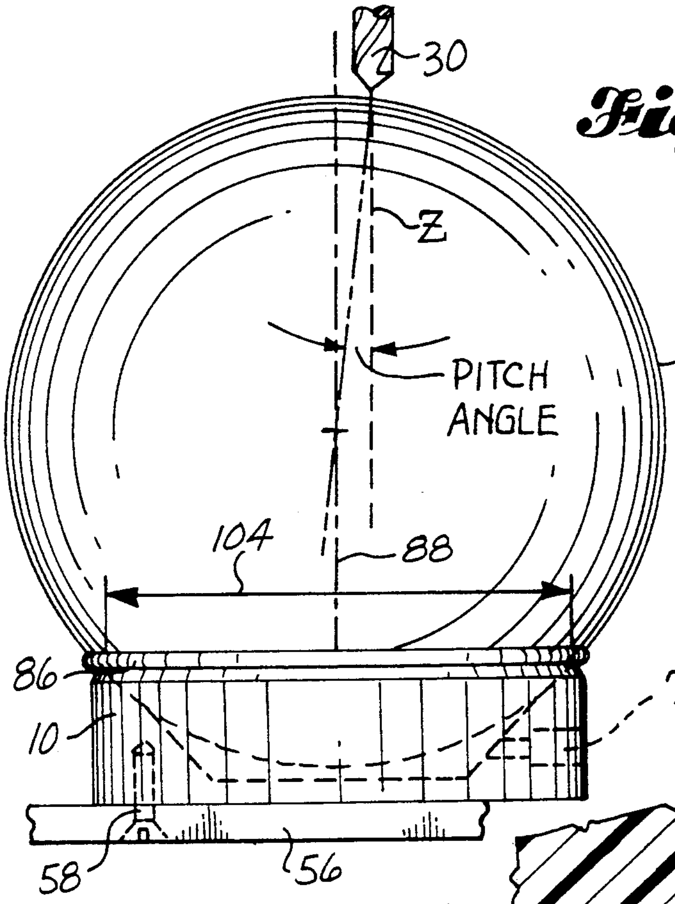
FIG. 4 is an elevational view showing a bowling ball on the vacuum dish, ready to be drilled, and showing the zenith axis of the bowling ball offset laterally from the hole boring bit axis.

As clearly shown by FIGS. 1 and 4, the vacuum holder or dish 10 is secured to a mounting plate 56, such as by means of a plurality of bolts 58 which extend upwardly through openings in plate 56 into threaded openings within the base of the vacuum dish 10. The mounting plate 56 is secured to the support table 12 by means of two or more nut and bolt assemblies 60. The head of each such bolt is sized to look fit within a T-slot 54. That is, the width of the bolt head is smaller than the width of the base portion of a T-slot 54, but wider than the upper portion of the T-slot 54. The shank of the bolt is sized to fit within the upper narrow portion of the slot 54. As will be apparent, the bolt heads are placed within the slots 54, with the shank portion of the bolts directed upwardly. Then, the bolt receiving openings in the mounting plate 56 are aligned with the shank portions of the bolts and the plate 50 is set down onto the support table 12, with the shank portions of the bolts moving relatively through the bolt holes in the process. Then a washer is placed on each bolt and the nut is attached and tightened for the purpose of firmly clamping the mounting plate 56 to the support table 12. The mounting plate 56 is positioned at a location which substantially centers the vacuum dish 10 relative to the hole boring bit axis Z. As will hereinafter be described, the final adjustment is achieved by use of the controls 48, 50 for shifting the support table 12, and the vacuum dish 10, in position along the X and Z axes.

Referring to FIGS. 1-5, in preferred form the vacuum dish 10 is constructed from metal and is in fact in the shape of a dish. It may be turned on a metal lathe to the shape illustrated. Vacuum dish 10 includes a closed bottom 62 and a sidewall 64 extending upwardly from the outer periphery of the bottom 62. Sidewall 64 includes a cylindrical outer surface 66 and a conical inner surface 68. A second conical surface 70 is provided at the upper periphery of sidewall 64. It is formed by a bevel surface which extends entirely about the dish 10. Surface 70 is an upwardly converging conical surface which meets the inner surface 68 at a circular rim 72. Rim 72 forms a hard seat for a bowling ball 74. When a bowling ball 74 is set down onto the rim 72 its lower portion is spaced above the bottom 62. Bottom 62 and sidewall 64 together form a vacuum chamber 76 which becomes a closed chamber when the ball 74 is seated on the rim 72. The lower portion of the ball 74 provides the upper closure for the vacuum chamber 76. As shown by FIGS. 1-5, at least one sidewall passageway 78 is provided in the sidewall 64. The inner end of passageway 78 communicates with vacuum chamber 76. The outer end of passageway 78 may be internally threaded at 80, adapting it for reception of an externally threaded end portion of a conduit 82. Conduit 82 extends to a source of negative pressure, e.g. a vacuum pump (not shown). Per customary practice, conduit 82 may include a vacuum gauge 84.

Figure 5:
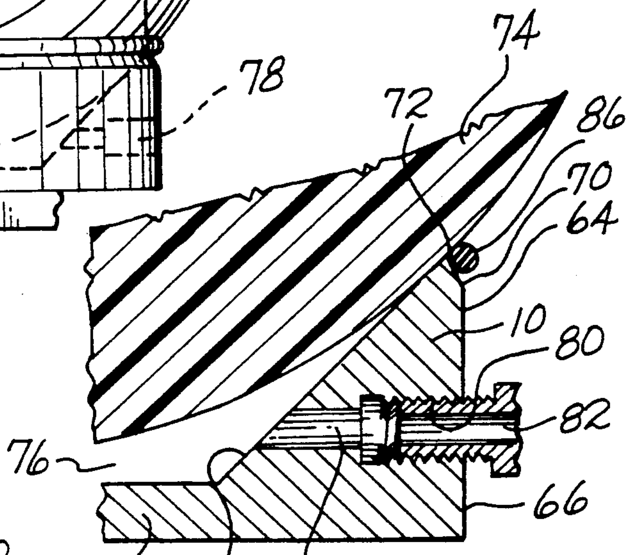
FIG. 5 is an enlarged scale, fragmentary vertical sectional view showing the ball in contact with the hard rim of the vacuum dish and showing the seal ring in contact with the both the ball and a bevel surface on the vacuum dish.

According to an important aspect of the invention, the vacuum dish 10 is provided with an elastomeric O-ring 86. An O-ring constructed from hollow tubing, e.g. surgical tubing, was found to be particularly suitable. O-ring 86 has a relaxed inside diameter which is smaller than the diameter of sidewall surface 66. Accordingly, the O-ring 86 must be stretched in order to place it on the vacuum dish 10, in contact with sidewall surface 66. As shown by FIG. 5, after a bowling ball 74 has been placed on the rim 72, the O-ring 86 is moved upwardly onto the conical surface 70. Conical surface 70 facilitates movement of the O-ring 86 into tight engagement or contact with the bowling ball surface which immediately outwardly borders the rim or seat 72. Elastic energy is stored in the O-ring 86 when it is stretched in order to place it onto the cylindrical sidewall surface 66. When O-ring 86 is moved onto the conical surface 70, the stored energy is released and the O-ring 86 contracts in diameter until it makes contact with the surface of ball 74. The stored energy then presses inner surface portions of the O-ring 86 into contact with both conical surface 70 and the adjacent surface of ball 74. When the vacuum system is operated to draw a vacuum in chamber 76, the ball 74 is moved into tight engagement with the hard rim 72. O-ring 86 does not interfere with this movement or with a solid seating of the ball 74 on rim 72. Then, the position of the O-ring seal 86 ensures an air tight seal between the vacuum dish and the bowling ball 74.

As stated above, when the vacuum dish 10 and its mounting plate 56 are secured to the support table 12, and attempt is made to closely center the vacuum dish 10 relative to the milling bit 30. This can be done by an eyeball placement, by use of a string suspended from the hole boring bit 30 with its lower end connected to a weight, in the manner of a plumb bob, or by the use of a ruler or similar straight member set vertical with its upper end placed adjacent the hole boring bit 30. When a rough center position is achieved, and the nut and bolt assembly 60 have tightened to firmly clamp the mounting plate 56 to the table 12, the adjustments 48, 42 and 50, 44 are used to achieve a true center or zero position.

The true center or zero position can be obtained by drilling test holes in a junk ball, using a pitch gauge to check the position of a hole relative to true center, and adjusting the position of the ball towards true center until the pitch gauge shows that the true center position has been reached. Or, the vacuum dish 10 can be centered by use of a tool known as a "Baxter plug cutter." This tool is mounted in the chuck of the spindle 24. Regardless of what method is used, once the vacuum dish 10 is centered relative to the Z axis, the gauges associated with the controls 46, 48 and 50, 52 are set to a "zero" position. The machine composed of the standard vertical axis milling machine and the specially constructed vacuum dish 10 is now ready for use to form finger and thumb holes in bowling balls.

The operation of the equipment will now be described: A bowling ball 74 is set down onto the hard rim 72, with the elastomeric seal ring 86 positioned downwardly into contact with cylindrical surface 66. Then, the O-ring seal 86 is moved vertically upwardly onto the conical surface 70, and in contact with the bowling ball 74 where it immediately outwardly bounds the seat 72. The vacuum pump (not shown) is then turned on. A vacuum pump control switch may be provided in easy reach adjacent the machine 14, with the pump itself being set back away from the machine. A sufficient negative pressure is provided in the chamber 76 to cause the ball 74 to be pressed into tight contact with the rim 72. The stored energy in the seal ring 86 and the vacuum will hold the seal ring 86 into tight sealing contact with both the bowling ball 74 and the conical surface 70 on the vacuum dish 10. The vacuum gauge 84 informs the operator of the vacuum established by the pump. There should be at least a minimum about fifteen inches of vacuum. The O-ring seal 86 seals against vacuum leaks due to out-of-round balls, balls with heavy sanded grooves, or balls having engraved logos in their outer surface. If a given ball should be grossly out-of-round, or has a major surface depression adjacent the rim 72, a plasticene clay can be applied between the ball 74 and the surface 70 in order to achieve a tight seal.

Before drilling it is necessary to position a ball 74 relative to the hole boring bit 30 in order to obtain the desired pitch of the hole that is to be drilled. The "pitch" of a hole is the angle between the longitudinal center of the hole and a radius line. This is shown in FIG. 4, with the pitch angle being labeled "pitch angle." As can be seen from FIG. 4, a lateral adjustment of the vertical center axis 88 of ball 74 relative to the bit axis Z changes the pitch angle. The amount of adjustment of the ball 74 along the X and Y axes, in order to achieve the desired pitch angle of a given hole, can easily be calculated. The operator makes this calculation and then operates the control wheels 48, 50 to properly position the ball 74.

There is a small amount of slack in the lead screw drives of the positioning base of the milling machine 14. This slack is usually no more than twenty thousands of an inch. Most of this slack can be eliminated by proper operation of the machine. This is done by zeroing the supporting table position by rotation of the wheels 48, 50 in a specific direction (clockwise or counterclockwise). Adjustments in position of the support table 12 for purposes of positioning the ball 74 to establish a pitch angle should be made in the same direction that the controls were moved to zero the support table. By way of example, if the table is zeroed by a clockwise rotation of the wheels 48, 50, movement of the ball 74 to establish a pitch angle should also be made by a clockwise rotation of the wheels 48, 50. A wheel 48 or 50 is rotated in the counterclockwise direction to place the ball away from the desired position. Then, the wheel 48 or 50 is rotated slowly in the clockwise position to move the ball 74 into the desired position. This manner of operation removes most of the slack that is in the lead screw mechanism. This should reduce the accuracy of location of the hole to within five thousands of an inch.

It is desired that at least some of the holes be oblong in cross section rather than circular. By use of the present invention, it is possible to produce accurately placed and accurately formed oblong holes which have smooth side surfaces. This is because of the ability to adjust the bowling ball 74 sideways in small increments and because the hole boring bit stays true to the bit axis Z.

Figure 6:
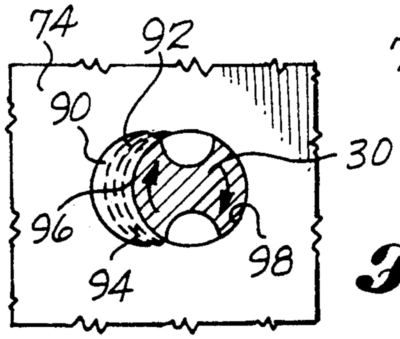
FIG. 6 is a fragmentary plan view of the ball at the location of a finger or thumb hole, showing the hole boring bit in section, and in the process of widening a previously drilled hole.
Figure 7:
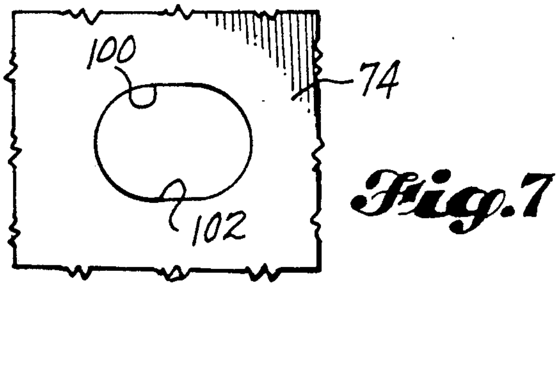
FIG. 7 is a view like FIG. 6, following completion of the hole, and showing the oblong shape of the completed hole.

An oblong hole is formed in the following manner: a circular hole is first drilled at the proper location, in the manner described above. Then, the hole boring bit 30 is withdrawn from the hole. Next, the controls are operated to reposition the ball 74 sideways, in the direction in which it is wished to widen the hole. This is illustrated in FIG. 6 of the drawing. Referring to FIG. 6, reference numeral 90 designates the original circular hole. Reference numeral 92 shows the second pass of the hole boring bit 30 into the hole. Reference numeral 94 identifies a third pass. Reference numeral 96 identifies a fourth pass. The fifth pass is in progress and it is designated by reference numeral 98. An advantageous feature of using a hole boring machine and a hole boring bit 30 is that a side portion of a hole can be progressively "shaved" in this manner. The spindle 24 of the hole boring machine 14 holds the hole boring bit 30 in a true position. The hole boring bit 30 cuts both at its end and on its side. During the second and subsequent passes, the hole boring bit 30 encounters ball material 74 at only one side of the hole. The cutting of an oblong hole in increments, as has been described, results in the formation of a smooth oblong hole which has relatively flat, substantially parallel opposite sides 100, 102, as shown in FIG. 7. The increments of movement of the hole boring bit 30 are small enough that cusps are not formed in the surfaces 100, 102.

The vacuum dish 10 has proven to provide a vibration free holder for the bowling ball. Contact between the ball 74 and the vacuum holder 10 occurs at the hard rim 72 which has a diameter 104 which is relatively large in comparison with the diameter of the bowling ball 74. Also, the rim 72 is positioned in a horizontal plane that is in close proximity to the support table 12. As shown by FIG. 4, a downwardly directed force imposed by a hole boring bit 30 on the curved surface of the bowling ball 74, at a location offset from the true center of the ball 74, will be opposed by the contact between the hard rim 72 and the ball 74. The vacuum force is sufficient to hold the ball 74 tight against the rim 72, with no vibration of the ball 74 relative to the vacuum dish 10. The vacuum dish 10 is firmly secured to the mounting plate 56 and the mounting plate 56 is firmly secured to the support table 12. Thus, the force of the hole boring bit 30 acting on the bowling ball 74 does not cause vibration of vacuum dish 10, mounting plate 56, or support table 12. The upper portion of the ball 74 is completely free of support structure. Accordingly, there is ready access of the hole boring bit 30 to any location on the ball 74 whereat it is desired to form a finger or thumb hole. The use of a hole boring machine in place of a drill press eliminates the flexible spindle problem presented when a drill press is used. The spindle of a vertical axis drill press will flex an unacceptable amount if an attempt is made to use a drill press for shaving the holes to provide an oval or oblong cross-sectional shape. The flex of the spindle, and the resulting wobble of the drill bit, will result in the formation of a tapered hole which is not conducive to either a proper fit or a proper release. As stated, a solution to the flexible spindle problem is to utilize a hole boring machine in place of a drill press. The spindle diameter of the milling machine is much larger than the spindle diameter of a drill press, resulting in elimination of the flexing problem. The built-in support table adjustment of a hole boring machine, calibrated in thousands of an inch, simplifies the design of the ball holder. The cost of table top hole boring machines is not prohibitive to a bowling establishment, or small specialty shop, which provides the service of custom fitting of bowling balls to the hand of the customer.

It is also within the scope of the invention to specially construct a machine that is like a hole boring machine, but is dedicated to the drilling of finger and thumb holes in bowling balls. The machine will have to have a frame and spindle support which provides the desired rigidity of the spindle, causing the hole boring bit to stay true on the hole boring bit axis, and the precision position adjustment of the support table. The vacuum dish of the present invention is extremely simple in that the only moving part is the O-ring seal. It is recognized that the vacuum dish may be used for supporting a bowling ball 74 while performing some function other than the drilling and hole boring of finger and thumb holes.

From the foregoing, further modifications, component arrangements, and modes of utilization of the invention will be apparent to those skilled in the art to which the invention is addressed. The scope of protection is not be limited by the details of the embodiment which has been illustrated and described. Rather, the scope of protection is to be determined by the appended claims, interpreted in accordance with the established rules of patent claim interpretation, including use of the doctrine of equivalents.

What is claimed is:

1. A method for precision milling and placement of a finger or thumb hole in a bowling ball, comprising:

providing a rigid vacuum dish which has a rigid annular sidewall defining a vacuum chamber and including an upwardly directed circular hard rim and a rigid base;

placing the vacuum dish on a horizontal support table portion of a vertical axis milling machine which is supported for precision adjustment in position within a horizontal plane along X and Y axes below a spindle which is supported for precision rotation about a vertical axis;

rigidly securing the vacuum dish base to said support table;

positioning in said spindle an elongated hole boring bit of a type including a cutting tip having end and side portions which cut when the bit is rotated about, and advanced endwise downwardly along, said vertical axis;

placing a bowling ball on the circular hard rim of the vacuum dish;

sealing between the vacuum dish and the bowling ball;

connecting the vacuum chamber with a source of negative pressure sufficient to hold the bowling ball into a fixed position against the circular hard rim;

adjusting the horizontal support table in position to place the tip of the hole boring bit in alignment with the starting point for a finger or thumb hole;

then rotating said milling bit and moving it downwardly along the vertical axis into contact with the bowling ball and then into the bowling ball to form a hole of a desired depth;

then withdrawing the hole boring bit out from said hole; and adjusting the horizontal support table in position after withdrawing the drilling bit out from the hole, to move the hole slightly to one side of the drill path of the hole boring kit, then rotating and advancing the hole boring bit endwise downwardly into the bowling ball to widen the previously formed hole.

2. A machine for precision milling and placement of finger and thumb holes in bowling balls, comprising:

a rigid frame having an upper portion and a lower portion;

a spindle and a spindle drive supported by the upper portion of said frame for precision rotation of said spindle about a vertical Z axis;

an elongation hole boring bit supported by said spindle, said spindle drive and said upper portion of the frame, for precision rotation and precision downward advancement along said Z axis, said hole boring bit including a cutting tip having end and side portions which cut when the bit is rotated about, and advanced endwise downwardly along, the Z axis;

a horizontal support table;

a positioning base for said support table, supported by the lower portion of said frame, said positioning base including adjustment means for precision movement of the support table within a horizontal plane, along X and Y axes;

a rigid vacuum dish rigidly secured to said support table, for precision movement along with said support table, said vacuum dish including a rigid annular sidewall defining an upwardly directed, rigid bowling ball supporting circular rim, and a vacuum chamber which is closed by a bowling ball when the bowling ball is positioned on said rigid circular rim;

means for establishing a vacuum within said vacuum chamber of sufficient strength to hold the bowling ball in a fixed rigid position on said rigid circular rim; and an elastomeric seal ring surrounding said rigid sidewall and movable axially upwardly along the sidewall into a position of contact with both said sidewall and a bowling ball that has been positioned on said rigid circular rim;

whereby the adjustment means can be operated to move the bowling ball horizontally along the X and Y axes to position the Z axis at a location whereat it is desired to provide a finger or thumb hole in the bowling ball, and then the bowling ball can be held rigidly in such position while the hole boring bit is rotated and advanced endwise along the Z axis into the bowling ball.

3. A machine for precision milling and placement of finger and thumb holes in bowling balls, comprising:

a rigid frame having an upper portion and a lower portion;

a spindle and a spindle drive supported by the upper portion of said frame for precision rotation of said spindle about a vertical Z axis;

an elongation hole boring bit supported by said spindle, said spindle drive and said upper portion of the frame, for precision rotation and precision downward advancement along said Z axis, said hole boring bit including a cutting tip having end and side portions which cut when the bit is rotated about, and advanced endwise downwardly along, the Z axis;

a horizontal support table;

a positioning base for said support table, supported by the lower portion of said frame, said positioning base including adjustment means for precision movement of the support table within a horizontal plane, along X and Y axes;

a rigid vacuum dish rigidly secured to said support table, for precision movement along with said support table, said vacuum dish including a rigid annular sidewall defining an upwardly directed, rigid bowling ball supporting circular rim, and a vacuum chamber which is closed by a bowling ball when the bowling ball is positioned on said rigid circular rim; and means for establishing a vacuum within said vacuum chamber of sufficient strength to hold the bowling ball in a fixed rigid position on said rigid circular rim, whereby the adjustment means can be operated to move the bowling ball horizontally along the X and Y axes to position the Z axis at a location whereat it is desired to provide a finger or thumb hole in the bowling ball, and then the bowling ball can be held rigidly in such position while the hole boring bit is rotated and advanced endwise along the Z axis into the bowling ball; and wherein said vacuum dish includes a bottom connected to said sidewall, and a port extending through said sidewall, said port being a part of the means for establishing a vacuum within the vacuum chamber.

4. A machine for precision milling and placement of finger and thumb holes in bowling balls, comprising:

a rigid frame having an upper portion and a lower portion;

a spindle and a spindle drive supported by the upper portion of said frame for precision rotation of said spindle about a vertical Z axis;

an elongation hole boring bit supported by said spindle, said spindle drive and said upper portion of the frame, for precision rotation and precision downward advancement along said Z axis, said hole boring bit including a cutting tip having end and side portions which cut when the bit is rotated about, and advanced endwise downwardly along, the Z axis;

a horizontal support table;

a positioning base for said support table, supported by the lower portion of said frame, said positioning base including adjustment means for precision movement of the support table within a horizontal plane, along X and Y axes;

a rigid vacuum dish rigidly secured to said support table, for precision movement along with said support table, said vacuum dish including a rigid annular sidewall defining an upwardly directed, rigid bowling ball supporting circular rim, a bottom connected to said sidewall, a port extending through said sidewall, and a vacuum chamber which is closed by a bowling ball when the balling ball is positioned on said rigid circular rim wherein said sidewall includes an upwardly converging conical outer surface outwardly adjacent the circular rim, an elastomeric seal ring contacting said conical surface when said seal ring is in contact with the bowling ball, said conical surface facilitating movement of said elastomeric seal ring into contact with the bowling ball; and means for establishing a vacuum within said vacuum chamber of sufficient strength to hold the bowling ball in a fixed rigid position on said rigid circular rim, said port being a part of the means for establishing a vacuum within the vacuum chamber;

whereby the adjustment means can be operated to move the bowling ball horizontally along the X and Y axes to position the Z axis at a location whereat it is desired to provide a finger or thumb hole in the bowling ball, and then the bowling ball can be held rigidly in such position while the hole boring bit is rotated and advanced endwise along the Z axis into the bowling ball.

5. A machine according to claim 2, wherein said sidewall includes an upwardly converging conical outer surface outwardly adjacent the circular rim, said elastomeric seal ring contacting said conical surface when said seal ring is in contact with the bowling ball, said conical surface facilitating movement of said elastomeric seal ring towards the bowling ball.

6. A machine for precision milling and placement of finger and thumb holes in bowling balls, comprising:

a rigid frame having an upper portion and a lower portion;

a spindle and a spindle drive supported by the upper portion of said frame for precision rotation of said spindle about a vertical Z axis;

an elongation hole boring bit supported by said spindle, said spindle drive and said upper portion of the frame, for precision rotation and precision downward advancement along said Z axis, said hole boring bit including a cutting tip having end and side portions which cut when the bit is rotated about, and advanced endwise downwardly along, the Z axis;

a horizontal support table;

a positioning base for said support table, supported by the lower portion of said frame, said positioning base including adjustment means for precision movement of the support table within a horizontal plane, along X and Y axes;

a rigid vacuum dish rigidly secured to said support table, for precision movement along with said support table, said vacuum dish including a rigid annular sidewall defining an upwardly directed, rigid bowling ball supporting circular rim, and a vacuum chamber which is closed by a bowling ball when the bowling ball is positioned on said rigid circular rim; and means for establishing a vacuum within said vacuum chamber of sufficient strength to hold the bowling ball in a fixed rigid position on said rigid circular rim, whereby the adjustment means can be operated to move the bowling ball horizontally along the X and Y axes to position the Z axis at a location whereat it is desired to provide a finger or thumb hole in the bowling ball, and then the bowling ball can be held rigidly in such position while the hole boring bit is rotated and advanced endwise along the Z axis into the bowling ball; and said machine further including a base plate below the vacuum dish, said vacuum dish being rigidly connected to the base plate, said base plate being rigidly secured to said horizontal support table.

7. A machine according to claim 6, wherein said horizontal support table includes longitudinal T-slots, and said base plate is secured to the horizontal support table by screw fasteners having enlarged portions located with the T-slots.

8. A machine according to claim 6, wherein said vacuum dish includes a bottom connected to said sidewall, and a port extending through said sidewall, said port being a part of the means for establishing a vacuum within the vacuum chamber.

9. A machine for precision milling and placement of finger and thumb holes in bowling balls, comprising:

a rigid frame having an upper portion and a lower portion;

a spindle and a spindle drive supported by the upper portion of said frame for precision rotation of said spindle about a vertical Z axis;

an elongation hole boring bit supported by said spindle, said spindle drive and said upper portion of the frame, for precision rotation and precision downward advancement along said Z axis, said hole boring bit including a cutting tip having end and side portions which cut when the bit is rotated about, and advanced endwise downwardly along, the Z axis;

a horizontal support table;

a positioning base for said support table, supported by the lower portion of said frame, said positioning base including adjustment means for precision movement of the support table within a horizontal plane, along X and Y axes;

a rigid vacuum dish rigidly secured to said support table, for precision movement along with said support table, said vacuum dish including a rigid annular sidewall defining an upwardly directed, rigid bowling ball supporting circular rim, said sidewalls including an upwardly converging conical outer surface outwardly adjacent the circular rim;

a vacuum chamber which is closed by a bowling ball when the bowling ball is positioned on said rigid circular rim;

a base plate below the vacuum dish, said vacuum dish being rigidly connected to the base plate, said base plate being rigidly secured to said horizontal support table;

an elastomeric seal ring surrounding said rigid sidewall and movable axially upwardly along the sidewall into a position of contact with both said sidewall and the bowling ball that has been positioned on said rigid circular rim, said elastomeric seal ring contacting said conical surface when said seal ring is in contact with the bowling ball, said conical surface facilitating movement of said elastomeric seal ring towards the bowling ball; and means for establishing a vacuum within said vacuum chamber of sufficient strength to hold the bowling ball in a fixed rigid position on said rigid circular rim, whereby the adjustment means can be operated to move the bowling ball horizontally along the X and Y axes to position the Z axis at a location whereat it is desired to provide a finger or thumb hole in the bowling ball, and then the bowling ball can be held rigidly in such position while the hole boring bit is rotated and advanced endwise along the Z axis into the bowling ball.

10. A machine according to claim 9, wherein said vacuum dish includes a bottom connected to said sidewall, and a port extending through said sidewall, said port being a part of the means for establishing a vacuum within the vacuum chamber.

11. A machine for precision milling and placement of finger and thumb holes in bowling balls, comprising:

a rigid frame having an upper portion and a lower portion;

a spindle and a spindle drive supported by the upper portion of said frame for precision rotation of said spindle about a vertical Z axis;

an elongation hole boring bit supported by said spindle, said spindle drive and said upper portion of the frame, for precision rotation and precision downward advancement along said Z axis, said hole boring bit including a cutting tip having end and side portions which cut when the bit is rotated about, and advanced endwise downwardly along, the Z axis;

a horizontal support table;

a positioning base for said support table, supported by the lower portion of said frame, said positioning base including adjustment means for precision movement of the support table within a horizontal plane, along X and Y axes;

a rigid vacuum dish rigidly secured to said support table, for precision movement along with said support table, said vacuum dish including a rigid annular sidewall defining an upwardly directed, rigid bowling ball supporting circular rim, said sidewall including an upwardly converging conical outer surface outwardly adjacent the circular rim, said vacuum dish including a bottom connected to said sidewall, and a port extending through said sidewall, said port being a part of the means for establishing a vacuum within the vacuum chamber, and a vacuum chamber which is closed by a bowling ball when the bowling ball is positioned on said rigid circular rim; and a base plate below the vacuum dish, said vacuum dish being rigidly connected to the base plate, said base plate being rigidly secured to said horizontal support table;

an elastomeric seal ring surrounding said rigid sidewall and movable axially upwardly along the sidewall into a position of contact with both said sidewall and the bowling ball that has been positioned on said rigid circular rim, said elastomeric seal ring contacting said conical surface when said seal ring is in contact with the bowling ball, said conical surface facilitating movement of said elastomeric seal ring towards the bowling ball; and means for establishing a vacuum within said vacuum chamber of sufficient strength to hold the bowling ball in a fixed rigid position on said rigid circular rim, whereby the adjustment means can be operated to move the bowling ball horizontally along the X and Y axes to position the Z axis at a location whereat it is desired to provide a finger or thumb hole in the bowling ball, and then the bowling ball can be held rigidly in such position while the hole boring bit is rotated and advanced endwise along the Z axis into the bowling ball.

12. A method for precision milling and placement of a finger or thumb hole in a bowling ball, comprising:

providing a rigid vacuum dish which has a rigid annular sidewall defining a vacuum chamber and including an upwardly directed circular hard rim;

placing the vacuum dish on a horizontal support table portion of a vertical axis milling machine which is supported for precision adjustment in position within a horizontal plane along X and Y axes below a spindle which is supported for precision rotation about a vertical axis;

securing the vacuum dish to said support table;

positioning in said spindle an elongated hole boring bit of a type including a cutting tip having end and side portions which cut when the bit is rotated about, and advanced endwise downwardly along, said vertical axis;

placing a bowling ball on the circular hard rim of the vacuum dish;

sealing between the vacuum dish and the bowling ball by positioning an elastomeric seal ring about the cylindrical sidewall of the vacuum dish and moving the elastomeric seal ring upwardly along the sidewall of the vacuum dish into contact with the bowling ball adjacent said circular hard rim;

connecting the vacuum chamber with a source of negative pressure sufficient to hold the bowling ball into a fixed position against the circular hard rim;

adjusting the horizontal support table in position to place the tip of the hole boring bit in alignment with the starting point for a finger or thumb hole;

then rotating said hole boring bit and moving it downwardly along the vertical axis into contact with the bowling ball and then into the bowling ball to form a hole of a desired depth; and then withdrawing the hole boring bit out from said hole.

13. For use with a support base which includes a support table and means for precision adjustment of the support table in position within a horizontal plane along X and Y axes, a bowling ball supporting vacuum dish comprising:

a base portion rigidly securable to the support table, a closed bottom, and a sidewall defining an upwardly directed bowling ball supporting circular rim, said sidewall and said bottom defining a vacuum chamber which is closed by a bowling ball when the bowling ball is positioned on the circular rim, and an elastomeric seal ring surrounding the sidewall of the vacuum dish, said seal ring being movable axially upwardly along the sidewall into position of contact with both the sidewall and a bowling ball that has been positioned on the circular rim, whereby the support table can be adjusted in position along the X and Y axes and the vacuum dish in the bowling ball will move with the support table, with the vacuum dish in tight contact with the circular rim.

14. Apparatus according to claim 13, wherein said sidewall includes an upwardly converging conical outer surface outwardly adjacent the circular rim, said elastomeric seal ring contacting said conical surface when said seal ring is in contact with the bowling ball, said conical surface facilitating movement of said elastic seal ring into contact with the bowling ball.

* * * * *

UNITED STATES PATENT AND TRADEMARK OFFICE

CERTIFICATE OF CORRECTION

PATENT NO. : 5,173,016

DATED : December 22, 1992

INVENTOR(S) : John D. Ellison and Ronald F. Hoppe

It is certified that error appears in the above-indentified patent and that said Letters Patent is hereby corrected as shown below:

TITLE PAGE:

In section [57] Abstract, 7th line from the bottom, insert -- bit -- after "hole boring".

Column 1, line 13, "BACKGROUND OF THE INFORMATION" should be -- BACKGROUND INFORMATION --.

Column 5, line 63, "look" should be -- lock --.

Column 9, lines 26, 31, 33, 38 and 49, "hole boring" should be -- milling --.

Claim 1, column 10, line 33, "kit" should be -- bit --.

Claim 2, column 10, line 43, "elongation" should be -- elongated --.

Claim 3, column 11, line 21, "elongation" should be -- elongated --.

Claim 4, column 11, line 67, "elongation" should be -- elongated --.

Claim 6, column 12, line 57, "elongation" should be -- elongated --.

UNITED STATES PATENT AND TRADEMARK OFFICE

CERTIFICATE OF CORRECTION

PATENT NO. : 5,173,016

DATED : December 22, 1992

INVENTOR(S) : John D. Ellison and Ronald F. Hoppe

It is certified that error appears in the above-indentified patent and that said Letters Patent is hereby corrected as shown below:

Claim 7, column 13, line 32, "with" should be -- within --.

Claim 9, column 13, line 44, "elongation" should be -- elongated --.

Claim 11, column 14, line 38, "elongation" should be -- elongated --.

Signed and Sealed this

Twenty-ninth Day of March, 1994

Attest:

BRUCE LEHMAN

Attesting Officer

Commissioner of Patents and Trademarks